US012605856B2

(12) United States Patent
Van Zoest et al.

(10) Patent No.: US 12,605,856 B2
(45) Date of Patent: Apr. 21, 2026

(54) TACTILE WEAR INDICATOR FOR A CUTTING ELEMENT

(71) Applicant: KONINKLIJKE PHILIPS N.V., Eindhoven (NL)

(72) Inventors: Peter Daniel Martijn Van Zoest, Zuidhorn (NL); Dirk Hendrik Wevers, Drachten (NL); Arno Kroezen, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 349 days.

(21) Appl. No.: 18/017,768

(22) PCT Filed: Jul. 16, 2021

(86) PCT No.: PCT/EP2021/069938

§ 371 (c)(1),
(2) Date: Apr. 12, 2023

(87) PCT Pub. No.: WO2022/023071

PCT Pub. Date: Feb. 3, 2022

(65) Prior Publication Data

US 2023/0191637 A1 Jun. 22, 2023

(30) Foreign Application Priority Data

Jul. 31, 2020 (EP) .................................... 20188801

(51) Int. Cl.

*B26B 19/38* (2006.01)
*B26B 19/04* (2006.01)
*B26B 19/40* (2006.01)

(52) U.S. Cl.

CPC .......... *B26B 19/3846* (2013.01); *B26B 19/04* (2013.01); *B26B 19/40* (2013.01)

(58) Field of Classification Search

CPC . B26B 21/4087; B26B 21/60; B26B 21/3846; B26B 21/04; B26B 21/40; Y10S 116/41; Y10S 76/08

(Continued)

(56) References Cited

U.S. PATENT DOCUMENTS 2,703,451 A * 3/1955 Herman .............. B26B 21/4087 30/41.7
5,388,331 A * 2/1995 Doroodian-Shoja Siamak ........... B26B 21/4087 30/41.7

(Continued)

FOREIGN PATENT DOCUMENTS

EP 0854018 A1 7/1998
EP 3530424 A1 8/2019

(Continued)

OTHER PUBLICATIONS

JPH11319340 English Translation; Yamagishi ; Nov. 24, 1999 ; B26B19/00.*

(Continued)

*Primary Examiner* — Laura M Lee

(57) ABSTRACT

A cutting element (106) for a hair cutting device (100) has a tactile wear indicator (140) that defines a skin-contact surface of the cutting element (106). The tactile wear indicator (140) has a wearable outer layer (148) of coating material having a dry lubricant additive (150), which reduces friction between the cutting element (106) and the skin of a user during shaving.

13 Claims, 5 Drawing Sheets

(58) Field of Classification Search
USPC ................................ 30/41.7, 346.52, 346.53
See application file for complete search history.

(56) References Cited

U.S. PATENT DOCUMENTS

| | | | | | |
|---|---|---|---|---|---|
| 5,603,161 | A * | 2/1997 | Welsh | B26B 21/44 30/41.7 |
| 6,207,294 | B1 * | 3/2001 | Rutter | B32B 3/266 30/348 |
| 6,436,546 | B1 * | 8/2002 | Gulikers | C23C 14/0042 204/192.15 |
| 9,327,416 | B2 * | 5/2016 | Madeira | C23C 16/01 |
| 10,478,388 | B2 * | 11/2019 | Wang | A61K 8/86 |
| 11,034,037 | B1 * | 6/2021 | Frances | B26B 21/4012 |
| 11,071,795 | B2 * | 7/2021 | Patel | A61L 2/28 |
| 11,192,269 | B2 * | 12/2021 | Aggelopoulou | B26B 21/4087 |
| 12,263,610 | B2 * | 4/2025 | Jacobs | B26B 9/02 |
| 2001/0038910 | A1 | 11/2001 | MacQueen | |
| 2002/0000041 | A1 * | 1/2002 | Doroodian-Shoja | B26B 21/4087 30/41.7 |
| 2002/0020065 | A1 | 2/2002 | Tseng | |
| 2002/0092174 | A1 * | 7/2002 | Wexler | B26B 21/443 30/41 |
| 2011/0126413 | A1 | 6/2011 | Szczepanowski | |
| 2014/0154808 | A1 | 6/2014 | Patel | |
| 2018/0133859 | A1 * | 5/2018 | Landwehr | F04D 29/289 |
| 2022/0152853 | A1 * | 5/2022 | Moustakas | B26B 21/225 |

FOREIGN PATENT DOCUMENTS

| | | | | |
|---|---|---|---|---|
| JP | H07124344 | A1 * | 11/1993 | B26B 19/04 |
| JP | H07124344 | A | 5/1995 | |
| JP | H11319340 | A | 11/1999 | |
| JP | 2000300860 | A | 10/2000 | |
| RU | 2550977 | C2 * | 5/2015 | B26B 21/4087 |
| WO | WO-9529044 | A1 * | 11/1995 | B26B 21/60 |
| WO | 2020109543 | A2 | 6/2020 | |

OTHER PUBLICATIONS

International Search Report and Written Opinion of PCT/EP2021/069938, dated Aug. 13, 2021.

* cited by examiner

TACTILE WEAR INDICATOR FOR A CUTTING ELEMENT

CROSS-REFERENCE TO PRIOR APPLICATIONS

This application is the U.S. National Phase application under 35 U.S.C. § 371 of International Application No. PCT/EP2021/069938, filed on Jul. 16, 2021, which claims the benefit of European Patent Application No. 20188801.3, filed on Jul. 31, 2020. These applications are hereby incorporated by reference herein.

FIELD OF THE INVENTION

The present invention is concerned with a cutting element for a hair cutting device, and in particular to tactile means for indicating to a user that the cutting element (specifically a blade at the cutting edge thereof) is worn out.

BACKGROUND OF THE INVENTION

Hair cutting devices, such as manual razors or electric shavers, are widely used to cut body hair and typically include a handle and a cutting element, on which one or more blades are mounted. Some cutting elements, such as those for electric shavers, have reciprocating cutters, which comprise a stationary outer cutting member and a movable inner cutting member which reciprocates with respect to the outer cutting member to perform a cutting operation. In some arrangements, the stationary outer cutting member may be provided with a plurality of cutter blades (or teeth) arranged in a row, and the inner cutting member may also be provided with a plurality of cutter blades (teeth) arranged in a row for cooperation with the cutter blades of the outer cutting member. In use, the stationary outer cutting member may come into direct contact with the user's skin.

With use, the blades of the cutting element will become blunt, which can result in reduced cutting performance and increased hair pulling. However, the extent of wear on the blades is not readily recognisable upon visual inspection. In view of this, it is known to equip cutting elements with visual wear indicators, which provide the user with an indirect indication of the extent of wear on the blades. Visual wear indicators typically comprise a wearable layer of material that is affixed to the cutting element at a position that is near to the blades and is configured to wear by a discernible amount when brought into sliding contact with the skin of the user over the working life of the cutting element. In this way, the extent of wear on the layer will provide a visual indication of the wear on the blades.

A problem with known arrangements, however, is that their effectiveness rely on being seen by the user. If the visual wear indicator is not seen by the user, the wear on a blade is not readily recognisable during a stroke of the cutting element until the dulled blade catches on and pulls the hairs, which can be painful to the user. Accordingly, there is a need for alternative or complementary means for indicating wear of the cutting element to a user.

SUMMARY OF THE INVENTION

According to an aspect, there is provided a cutting element for a hair cutting device, wherein the cutting element comprises: a cutting edge, a skin-facing region and a tactile wear indicator in the skin facing region; wherein the tactile wear indicator comprises a wearable outer layer that defines a skin-contact surface of the cutting element, the wearable outer layer comprising a coating material having a dry lubricant additive.

The wearable outer layer may define the skin-contact surface of the cutting element at any point during the working life of the wear indicator. For example, the wearable outer layer may be one of plural wearable layers of coating material that will form an outer skin-contact surface of the cutting element at respective points during the working life of the tactile wear indicator.

By providing a skin-contact surface defined by an outer layer of coating material having a dry lubricant additive, it may be possible to reduce the friction between the cutting element and the skin of a user during a cutting stroke of the cutting element along the skin. The provision of a dry lubricant additive may be particularly suitable for reducing friction during both dry and wet shaves, thereby improving the versatility of the cutting element for different shave types. This is especially the case as compared to hypothetical arrangements in which a water-soluble lubricant is provided.

The outer layer of coating material is wearable in that it is configured to wear away (e.g. by abrasion or otherwise) over time, e.g. as it is brought into sliding contact with the skin of the user. In this way, a quantity of dry lubricant additive may be lost from the skin-contact surface and so the extent of lubrication, and thus the gliding performance of the cutting element, may diminish when the wearable outer layer wears away. The loss of dry lubricant additive (by virtue of the layer being worn away) may be felt by the user as increased friction against the skin during a cutting stroke. In other words, the outer layer of coating material may wear such that a coefficient of friction of the skin-contact surface (i.e. a ratio of the force required to move the skin-contact surface along the skin and the normal force holding the two together) increases as the wearable outer layer wears away. This increase of friction may serve to provide the user with a tactile indication that the cutting element and thus the blade(s) at the cutting edge has worn.

The tactile wear indicator may have one of many different configurations. In embodiments, the wearable outer layer of coating material may coat a first material having a higher coefficient of friction than that of the coating material forming the wearable outer layer, such that friction to movement along the skin-contact surface will increase as the wearable outer layer of coating material wears away at the interface between the coating material and the first material. In that regard, an outwardly-facing surface of the first material, which is covered by the wearable outer layer, may become increasingly exposed and form an increasingly larger part of the skin-contact surface as the wearable outer layer wears down at the interface between the coating material and the first material.

The first material may be one that does not include a dry lubricant additive, or may be one that comprises a quantity of dry lubricant additive (by percentage weight of the material) that is smaller than that of the coating material forming the wearable outer layer. The first material may be an outwardly-facing surface of the cutting element in a skin facing region thereof. In some embodiments, however, the tactile wear indicator itself may have a multi-layered structure and the first material may be a coating material forming a first layer of the wear indicator which is covered by the wearable outer layer of coating material.

The coating material (forming the wearable outer layer) may comprise 1-20%, e.g. 1-10%, e.g. 5%, by weight of the dry lubricant additive.

The coating material may comprise a plurality of dry lubricant particles dispersed within a binding agent.

At least some of the dry lubricant particles may protrude from the binding agent such that they form at least part of the skin-contact surface of the cutting element. The dry lubricant additive may be exposed on the outer surface of the cutting element.

The dry lubricant particles may be in the form of spherical beads.

At least some of the dry lubricant particles may have spans that are larger than a thickness of the binding agent in the wearable outer layer. Where the dry lubricant particles are in the form of spherical beads, respective dry lubricant particles may have diameters that are larger than the thickness of the binding agent in the wearable outer layer.

The dry lubricant additive may be formed of glass. For example, the dry lubricant particles may be glass particles.

The coating material may comprise a binding agent in the form of an ink or a paint.

The cutting element may further comprise a visual wear indicator. The visual wear indicator may be provided in the skin-facing region, e.g. on an outwardly-facing surface of the cutting element in the skin-facing region of the cutting element. The visual wear indicator may be covered by the wearable outer layer. The visual wear indicator may have a contrasting appearance to the wearable outer layer. The visual wear indicator may be revealed upon wear (e.g. abrasion) of the wearable outer layer.

The visual wear indicator may be in the form of a first layer of coating material that is affixed to the cutting element. The visual wear indicator may form part of the tactile wear indicator. For example, the first layer of coating material may be the first material having a higher coefficient of friction than that of the coating material forming the wearable outer layer.

The first layer may have a first colour that is different to a colour of the wearable outer layer. Additionally or alternatively, the first layer may have an indicia or pattern on a surface which is covered by the wearable outer layer.

The wearable outer layer may have a wear rate that correlates to a wear rate of a blade of the cutting element.

According to another aspect, there is provided a hair cutting device comprising the cutting element of any preceding statement.

According to another aspect, there is provided a method for manufacturing a cutting element having a tactile wear indicator. The method may comprise: providing a cutting element comprising a cutting edge and a skin-facing region; and forming a tactile wear indicator by providing a wearable outer layer in the skin-facing region. The wearable outer layer defines a skin-contact surface (of the cutting element) and comprises a coating material having a dry lubricant additive.

The method may further comprise providing the cutting element with any one or more of the features of the cutting element described above.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
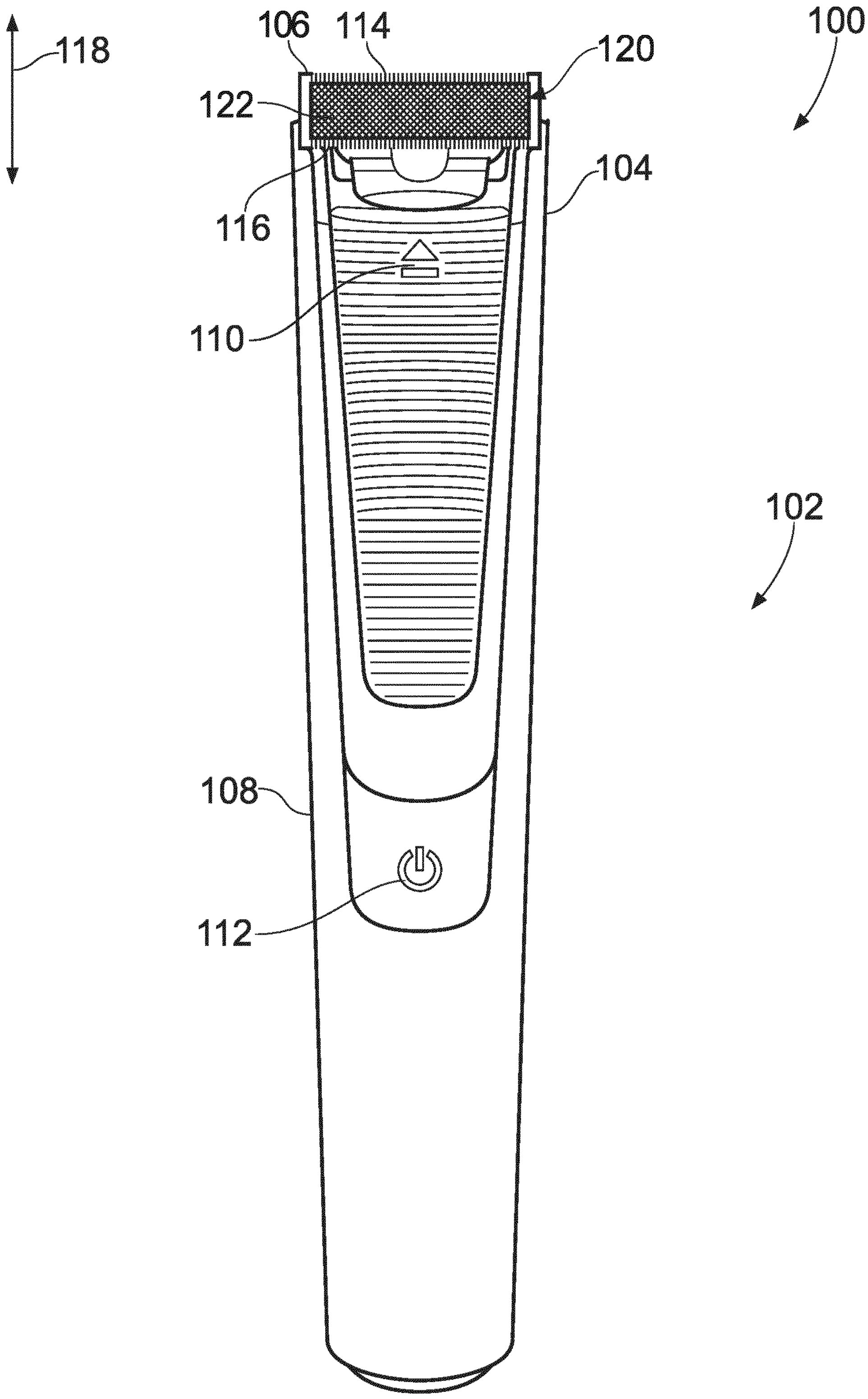
FIG. 1 is a front view of a hair cutting device comprising an electric shaver.

FIG. 1 generally shows a hair cutting device in the form of an electric shaver 100.

The electric shaver 100 comprises an elongate body 102 having a cutting head 104, on which a cutting element 106 is removably attached, and a handle portion 108 which generally extends away from the cutting head 104. The body 102 is generally formed by a housing which forms the external surface of the electric shaver body.

The handle portion 108 is an elongate grippable portion by which a user can grip the electric shaver 100 with their hand during use. The handle portion 108 is partially covered with a rubberised or textured surface to facilitate better gripping of the electric shaver 100 by the user, particularly when the handle portion 108 is wet. On a front face of the handle portion 108 there is provided an ejection button 110, which is suitable for activating an actuator or other mechanism to detach the cutting element 106 from the cutting head 104. There is also provided a power switch actuated by a power button 112 on the front face of the handle portion 108, which is for powering the electric shaver 100 on/off.

As will be described in further detail below, the cutting element 106 comprises a first pair of stationary and reciprocating blades (which may each comprise a plurality of blade teeth) and a second pair of stationary and reciprocating blades. The first pair of blades forms a first cutting edge 114 and the second pair of blades forms a second cutting edge 116 on laterally opposite sides of the cutting element 106. A cutting line 118 of the electric shaver 100 is normal to the first and second cutting edges 114, 116. The cutting line 118 defines the direction along which hairs should approach the blades at a given cutting edge 114, 116, to ensure that the electric shaver 100 cuts those hair effectively. That is, the electric shaver 100 cuts hair most effectively when moved in a direction along the cutting line 118.

A region 120 of the cutting element 106 that is proximate to the cutting edges 114, 116, in this example between the first cutting edge 114 and the second cutting edge 116 in a direction along the cutting line 118, faces the skin in use. Within the skin-facing region 120, there is an external skin-contact surface 122 that will generally be pressed against the user's skin during use for a close shave. The skin-contact surface 122 will be slid along the user's skin in a direction along the cutting line 118, such that one of the cutting edges 114, 116 moves forward along the user's skin along the cutting line 118 during a stroke of the cutting element 106, to cut any hairs that it encounters.

Figure 2:
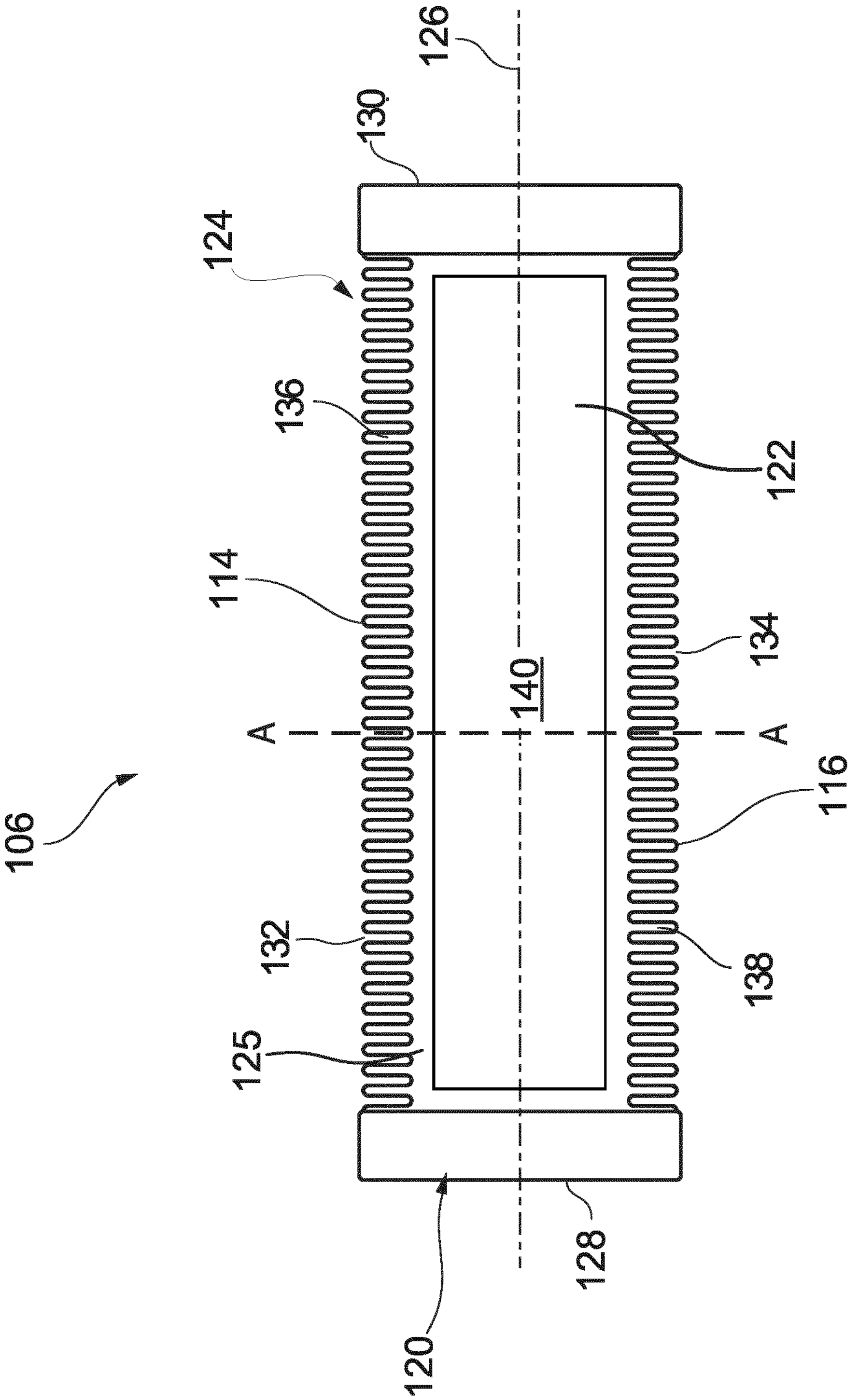
FIG. 2 is a front view of a cutting element of the hair cutting device of FIG. 1.

FIG. 2 shows a front view of the skin-facing region 120 of the cutting element 106 of FIG. 1.

The cutting element 106 comprises a stationary outer cutting member 124 that is located above a movable inner cutting member (not shown), which is moveable in a reciprocating manner relative to the stationary cutting member 124 and along a cutter axis 126. The movable cutting member is arranged to be driven by a motor provided in the handle portion 108 of the body 102 (shown in FIG. 1) of the electric shaver 100. The motor may be powered by a rechargeable battery contained within the housing of the electric shaver 100. The motor can be selectively turned on and off via the power switch by using the power button 112.

The stationary cutting member 124 has opposite first and second sides 128, 130 which are spaced apart in a direction parallel to the cutter axis 126 and which are generally parallel to one another. The stationary cutting member 124 further has opposite third and fourth sides 132, 134 spaced apart in a direction perpendicular to the cutter axis 126. The first and second cutting edges 114, 116 are respectively located on said opposite third and fourth sides 132, 134 of the stationary cutting member 124. The stationary cutting member 124 comprises first and second sets of primary blade teeth 136, 138 forming the stationary blades of the first and second cutting edges 114, 116, respectively. The primary cutter teeth 136, 138 are spaced apart along the cutting edge 114, 116 in a direction parallel to the cutter axis 126 so as to define hair-entry openings therebetween. The movable inner cutting member comprises first and second sets of secondary blade teeth forming the reciprocating blades of the cutting edges 114, 116. During use, hairs entering the openings between the primary cutting teeth 136, 138 are cut with a scissor-like action as the primary teeth of the stationary cutting member 124 and the secondary teeth of the moveable cutting member moves past one another.

As mentioned above, the blades (blade teeth) of both the moveable and stationary cutting members will become blunt over time, which can result in reduced cutting performance and increased hair pulling. Therefore, in order to provide the user with an indication of the extent of wear on the blade teeth, the skin facing region 120 of the cutting element 106 is provided with a tactile wear indicator 140. The tactile wear indicator 140 is affixed to an outwardly-facing surface 125 of the stationary cutting member 124 in the skin-facing region 120 and forms part of the skin-contact surface 122 of the cutting element 106. In the example of FIG. 2, the tactile wear indicator 140 has a rectangular shape, although it may have any shape and size suitable for covering some or all of the skin-facing region 120 of the cutting element 106.

Although not shown in FIG. 2, the tactile wear indicator 140 comprises at least one outer layer of coating material having a dry lubricant additive mixed therein. Dry lubricant additives are solid-phase lubricating materials that may be added to a binding agent, such as a liquid or solid powder material, which is then cured to form a solid material having a reduced coefficient of friction as compared to the original binding agent. That is, a dry lubricant additive is a solid substance to be added to a binding agent to improve lubricity of a material. There are a number of known types of dry lubricant additives, such as molydisulfide, polytetrafluorethylene (PTFE) or graphite additives, which are typically used to form anti-friction coatings that are applied to mating surfaces of moving components, to ensure smooth running of those components. Conventionally, anti-friction coatings are configured to be wear-resistant for the working life of the components to which they are applied, to ensure they are able to continue to provide lubrication between the components.

In the present embodiment, the outer layer has a first side that may be in direct contact or indirect contact (e.g. via one or more other layers of material) with the outwardly-facing surface 125 of the stationary cutting member 124, and a second, opposite side forming the skin-contact surface 122 on the exterior of the cutting element 106. In this way, the skin-contact surface 122 of the cutting element 106 may provide less friction to sliding movement along the skin of the user during a stroke of the cutting element 106, e.g. as compared to hypothetical arrangements in which a dry lubricant additive is absent from the outer layer.

In contrast to conventional applications in which a dry lubricant additive is provided in a wear-resistant coating, in the present invention the dry lubricant additive is provided in a layer of coating material that is configured to wear away, e.g. by abrasion, when in contact with the skin and/or hairs of the user during cutting strokes of the cutting element 106. As the outer layer is worn away, the lubrication properties of the skin-contact surface 122 (and thus the enhanced gliding performance of the cutting element 106) may be noticeably reduced. In this way, the user may be provided with a tactile indication of the extent of wear of the cutting element and correspondingly the likely extent of wear on the blade teeth. For example, the user may be able to recognise that the cutting element is worn (and therefore needs replacing) by virtue of increased friction felt on the skin during a cutting stroke.

Although FIGS. 1 and 2 have been described above with respect to an electric shaver having two cutting edges, each of which is formed by a pair of stationary and reciprocating blades, this is not required. The present invention, specifically the tactile wear indicator, is applicable to cutting elements having any number of blades or cutting edges. Further, the wear indicator is applicable more widely to cutting elements for any type of hair cutting devices, such as those for manual razors, which have one or more static blades provided on a stationary cutting member. Further still, the cutting element need not be removably attached to the body of the cutting device but may instead form an integral part of a single-piece body.

Figure 3A:
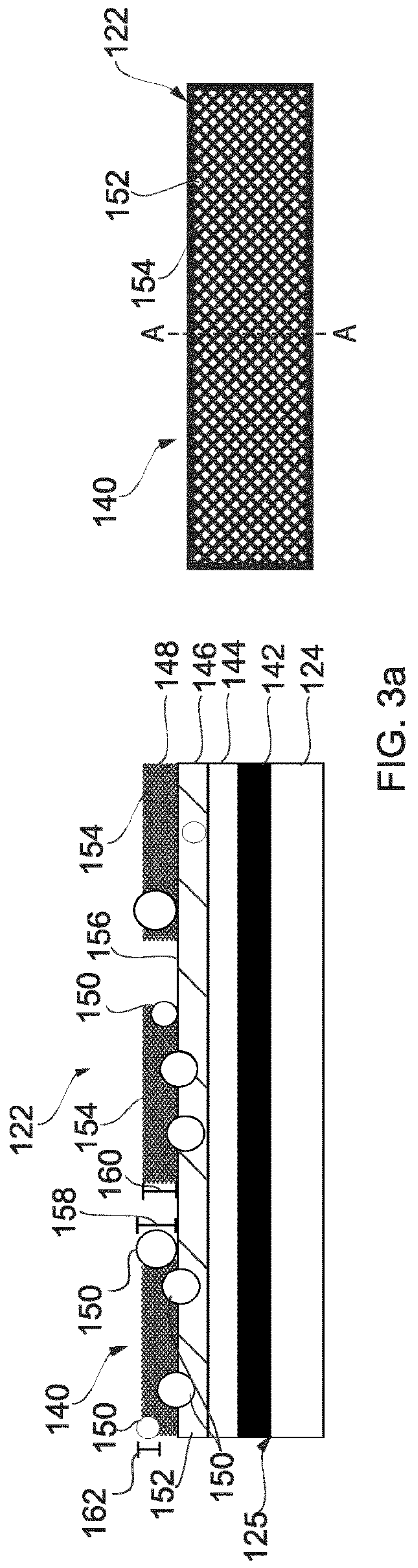
FIGS. 3*a* through 3*c* schematically illustrate an embodiment of a tactile wear indicator of the cutting element of FIG. 2, at different stages of wear.
Figure 3B:
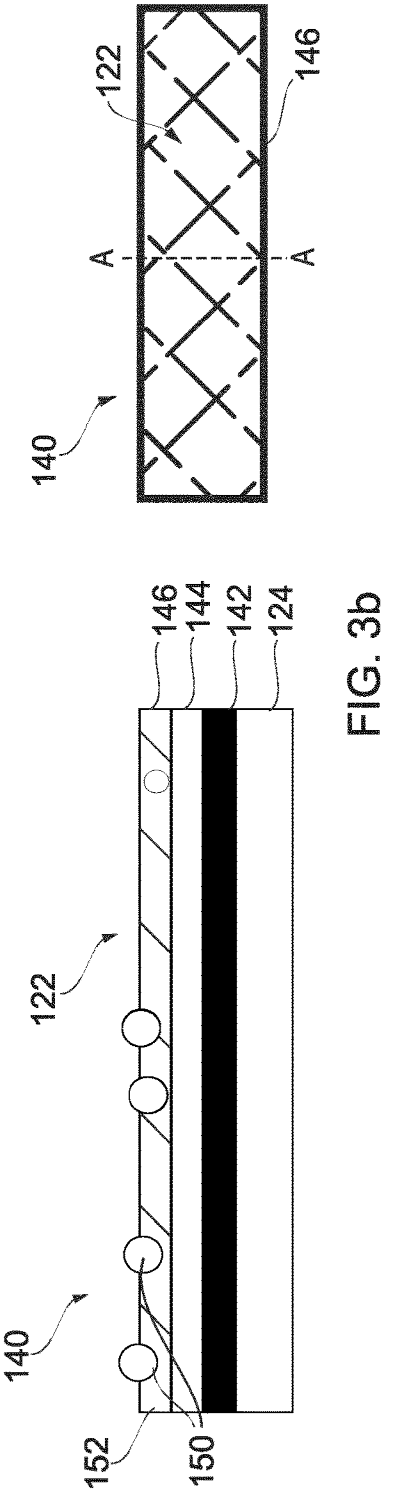
Figure 3C:
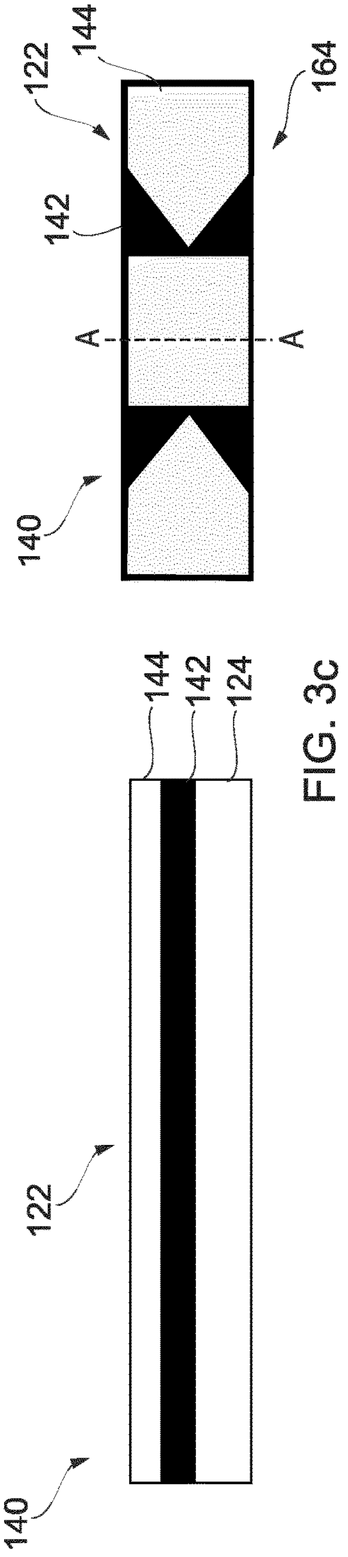

FIGS. 3*a* through 3*c* schematically illustrate an example embodiment of a tactile wear indicator 140 provided on the cutting element 106 of FIG. 2. FIGS. 3*a*-3*c* show the tactile wear indicator 140 when new, partly worn and fully worn at the intended end of the working life of the cutting element, respectively. Each one of FIGS. 3*a*-3*c* shows two views of the wear indicator 140: a first cross-sectional view (on the left-hand side of the Figure) along part of a line A-A traversing a lateral extent of the indicator 140 between the third and fourth sides of the cutting element; and a second, front view of the skin-facing surface 122 formed by the wear indicator 140 (on the right-hand side of the Figure).

In the example arrangement of FIG. 3, the wear indicator 140 has a multi-layered structure, wherein four layers 142, 144, 146, 148 of coating material are arranged in a stacked configuration on the stationary cutting member 124. The multi-layered structure comprises a first layer 142 affixed to and coating at least part of the outwardly-facing surface 125 of the stationary cutting member 124, a second layer 144 affixed to and coating the first layer 142, a third layer 146 affixed to and coating the second layer 144 and a fourth layer 148 affixed to and coating the third layer 146. The third and fourth layers 146, 148 are outer layers of the wear indicator 140 in that they form, at least in part, the skin-contact surface 122 of the cutting element.

The tactile wear indicator 140 may be manufactured using any suitable manufacturing apparatus and method, the selection of which may depend on the type of coating material to be used for the layers 142, 144, 146, 148. In the present example, each layer 142, 144, 146, 148 of coating material comprises a binding agent, in this example a print agent 152, 154 such as a solvent-based ink or a paint. Accordingly, any apparatus and method for depositing a print agent on to a substrate may be used for this. For example, the print agent may be deposited onto a surface using a so-called "pad printing" apparatus, whereby a deformable printing pad (e.g.

a silicon pad) is brought into contact with a plate of pre-prepared print agent and is used to transfer the print agent from the plate to a surface of the substrate to be printed.

The different layers 142, 144, 146, 148 of coating material forming the wear indicator 140 can be made of the same coating material or of different coating materials, e.g. different compositions of print agent. In that regard, the coating material may comprise the print agent and optionally one or more filler materials such as an adhesive resin and a hardener, e.g. lacquer, material. The specific composition of the coating material may depend on the function of the layer in question.

In the present example, the first layer 142 and the second layer 144 are permanent, wear-resistant layers of coating material that are configured to remain in place on the stationary cutting member 124 for at least the intended normal working life of the cutting element. The third layer 146 and the fourth layer 148 of coating material, however, are configured to be worn away during the normal working life of the cutting element, beginning with the exposed outer fourth layer 148 and then the third layer 146 which will become progressively more exposed with increasing wear of the fourth layer 148. Accordingly, the composition of the coating material in each layer can be tuned and selected at manufacture to ensure that the coating material in the first and second layers 142, 144 has a wear rate that is less than a wear rate of the coating material in the third and fourth layers 146, 148. Further, the coating material composition can be tuned to ensure that both the third and fourth layers 146, 148 will have a wear rate that correlates to a wear rate of a blade of the cutting element, i.e. to ensure the coating material for the third and fourth layers 146, 148 will be fully worn by the time the blades of the cutting element are also worn (e.g. to the point that they are blunt).

Without wishing to be bound by theory, the time (or rather, the number of uniformly sized cutting strokes) it takes for a given layer of coating material to become fully worn will depend on the thickness of the coating material (specifically the print agent and filler, if present) in that layer (measured along a Normal to the surface on which the layer is affixed) and the wear rate of the coating material in that layer (in terms of volume of print agent lost per cutting stroke). The wear rate of a layer of known thickness can be determined by suitable experimentation, e.g. by determining the number of uniformly sized cutting strokes of the cutting element (in terms of distance travelled along the skin) required to fully wear away the layer and by calculating the volume of coating material lost per cutting stroke based thereon.

As best illustrated in FIG. 3*a*, the third and fourth layers 146, 148 of coating material comprise a dry-lubricant additive 150 in addition to the print agent 152, 154 (and filler, if present) in those layers. In the illustrated example, the dry lubricant additive 150 is in the form of a plurality of dry lubricant particles 150 that serve to reduce the friction that the skin will encounter when brought into sliding contact with the third and fourth layers 146, 148. At least some of the dry lubricant particles 150 are exposed on the exterior of the wear indicator 140 in the fourth, outer layer 148 such that they, together with the print agent 154, define the skin contact surface 122 of the cutting element.

The dry lubricant particles 150 are at least partly encapsulated by the print agent 152, 154 forming the third and fourth layers 146, 148 such that they will be retained by the print agent 152, 154 during normal use of the cutting element, and in spite of the shear forces acting upon the particles during a normal cutting stroke. In that regard, the dry lubricant particles 150 will remain attached to the print agent 152, 154, and thus provide the lubrication benefits, until most if not all of the print agent 152, 154 that encapsulates the particles 150 is worn away and lost. This is in contrast to hypothetical arrangements in which a cutting element is provided with lubrication means comprising a permanent substrate and a soluble lubricant which is configured to continuously leach from the substrate during use in combination with water, to reduce friction between the substrate and the skin of the user.

Any type of dry lubricant particles 150, such as those formed of plastics or PTFE, may be used. However, in the present embodiment the dry lubricant particles 150 are glass particles, the properties of which are particularly effective for reducing friction whilst being user-safe and environmentally friendly, especially compared to plastics or PTFE like substances. One example of glass particles that are suitable for use in the present arrangement is the so-called “Coatosil” additive particles, e.g. “Coatosil DSA 10”, which may be purchased by Momentive Performance Materials Inc.

The dry lubricant particles 150 may take any suitable shape. However, in the present embodiment they are in the form of spherical beads, each of which has a substantially circular shape in cross-section (as shown in FIGS. 3*a* and 3*b*). This spherical shape may be particularly advantageous in that it provides a rounded profile that minimises the contact area and thus friction between the skin of the user and the skin-contact surface 122 when brought into contact.

Any suitable quantity of dry lubricant particles 150 may be used for reducing friction on the third and fourth layers 146, 148 to enhance the gliding performance of the cutting element. In some arrangements, however, the coating material(s) of the third and fourth layers 146, 148 comprises between 1% and 20%, e.g. between 1% and 10%, e.g. 5%, by weight of dry lubricant particles. The range of 1-20% should provide sufficient lubrication to achieve a noticeable reduction in friction, whilst keeping a sufficient quantity of print agent (and optionally filler) in the coating material to ensure the coating material has the structural integrity to allow it to be effectively applied and retained to surfaces. Values in the range of 1-10%, e.g. 5%, may be particularly advantageous in that they may provide an optimum balance between lubrication and structural integrity.

The skin-contact surface 122 will continuously change as the third and fourth layers 146, 148 wear away. The dry lubricant particles 150 are dispersed substantially throughout the print agent 152, 154 such that dry lubricant particles 150 will be newly exposed on the exterior of the wear indicator 140 as the print agent 152, 154 wears away. The particles may be distributed substantially uniformly throughout the print agent 152, 154 in the third and fourth layers 146, 148, i.e, wherein the third and fourth layers 146, 148 have the same percentage by weight of dry lubricant particles 150. In this way, the skin will contact a substantially constant number of particles 150, and thus experience consistent gliding performance, as the coating material in the third and fourth layers 146, 148 wears away. In other arrangements, however, the fourth layer 148 of coating material may have a greater percentage by weight of dry lubricant particles than that of the third layer 146, such that the extent of friction is increased as the fourth layer 148 wears away and the third layer 146 is increasingly exposed.

In the example of FIG. 3, at least some of the dry lubricant particles 150 in the third and fourth layers 146, 148 protrude from the rest of the coating material (specifically the print agent 152, 154) in those layers. In that way, the topography of the skin-contact surface 122 (at various points of wear) may comprise substantially planar sections formed by the print agent 152, 154 and raised sections formed by the dry lubricant particles 150. By forming raised sections on the skin-contact surface 122, the protruding particles 150 may lift the skin of the user from the planar sections (and generally the wider skin-contact region) of the cutting element, thereby reducing the contact area between the cutting element and the skin of the user and further improving the gliding performance during a cutting stroke. However, this effect is localised to the raised sections of the wear indicator 140, such that a portion of the skin-contact surface 122 will remain in contact with the skin of the user during a cutting stroke and correspondingly cause the outer layer 148 of coating material to wear (e.g. abrade).

The topography described above is achieved, in the present example, by ensuring that the thickness of the print agent 152, 154 (measured in a direction along the Normal to the surface 125 of the stationary cutting member 124 on which the wear indicator 140 is attached) is less than a span of a respective particle 150. The span of a particle 150 is its width or length as measured along a straight line spanning from one end of the particle to another. Where the dry lubricant particles 150 have spherical profiles, as described above, the span of a given particle 150 will be defined by its cross-sectional diameter. Accordingly, and as best shown in FIG. 3*a*, at least one dry lubricant particle 150 in the fourth layer 148 has a first diameter 158, e.g. of approximately 10 microns, which is larger than a thickness 160 of the print agent 154 in the fourth layer 148.

The span of the dry lubricant particles 150 need not be larger than the thickness of the print agent 152, 154 in a given layer 146, 148. In the illustrated example of FIG. 3, the coating material in each one of the third and fourth layers 146, 148 comprises a combination of differently sized particles 150. For example, as shown in FIG. 3*a*, at least one particle 150 in the fourth layer 148 has a second diameter 162 that is less than the thickness 160 of the print agent 152 in that layer 148. In other arrangements, all of the dry lubricant particles in a given layer will have spans that are less than the thickness of the print agent in that layer. In arrangements where at least some of the dry lubricant particles in a layer have diameters less than the thickness of the print agent in that layer, the properties of the print agent, such as the relative density of the print agent as compared to the particles, may be tuned such that the particles are directed towards the outer surface of the print agent, thereby causing them to protrude from the print agent in that layer. Regardless of its method of manufacture, the topography described above may be readily identifiable by inspection of a scanning electron microscope image of the wear indicator 140 captured using conventional techniques known in the art.

In the manner described above, the user will benefit from the enhanced gliding performance of the wear indicator 140 until the third and fourth layers 146, 148 have worn away. However, the extent of lubrication will progressively diminish as the third layer 146 wears down at the interface between the third layer 146 and the second layer 144 to expose an increasingly larger surface area of the second layer 144. With reference to FIG. 3*c*, if the user chooses to use the cutting element to perform a shaving operation when the third layer 146 is mostly or fully worn, the skin of the user will come into contact with the exposed second layer 144. In the present embodiment, the second layer 144 is formed of a coating material having a higher coefficient of friction than that of the coating material forming the third layer 146, such that friction to movement along the skin-contact surface 122 will increase as the third layer 146 wears away at the interface between the second and third layers 144, 146 to reveal the second layer 144. This is achieved, in the present example, by virtue of the second layer 144 of coating material having therein a zero quantity of dry lubricant additive. The increased friction on the third layer 144 will be noticed by the user as a corresponding reduction in comfort, as compared to when the cutting element and wear indicator 140 was new. In this way, the user will be provided with a noticeable tactile indication of the wear of the cutting element regardless of whether the user has seen signs of wearing on a blade of the cutting edge.

Although the wear indicator 140 has been described above as having a multi-layered structure having both lubricated and non-lubricated layers to provide the user with tactile feedback regarding the wear of the cutting element, the tactile wear indicator 140 may also provide the user with a visual indication of the extent of wear of the cutting element. In that regard, one or more of the layers of coating material may also function as a visual wear indicator. In the arrangement of FIG. 3, each one of the first, second and third layers 142, 144, 146 of coating material functions as a visual wear indicator in that it has a unique appearance that contrasts with at least that of the fourth layer 148, and is revealed upon wear of the layer immediately above the layer in question. In this way, the user may visually identify the extent of wear on the cutting element or blade based on the appearance of the skin-contact surface 122, i.e. based on which one or more of the first, second, third and fourth layers 142, 144, 246, 148 is exposed to define the skin-contact surface 122.

The appearance of the different layers 142, 144, 146, 148 may differ by virtue of their colour. For example, the print agents for respective layers 142, 144, 146, 148 may comprise different colour pigments (or percentage by weight of the same colour pigment). Additionally or alternatively, one or more layers 142, 144, 146, 148 may comprise a unique indicia or pattern on an outwardly facing surface of the layer 142, 144, 146, 148.

With reference to FIG. 3*a*, the fourth layer 148 of the tactile wear indicator 140 covers only a portion of the outwardly-facing surface 156 of the third layer 146, so as to form a cross-hatched pattern that is recognisable by the user as being indicative of a new cutting element. The third layer 146 may be substantially homogenous in colour (as represented in FIG. 3*b* by the broken lines in the right-hand view of the wear indicator 140) which, when exposed as a result of wear to the fourth layer 148, will indicate to the user that the cutting element is part way, and in examples at least halfway, through its intended workable life.

The first and second layers 142, 144 comprise coating material of different colours that combine to define a permanent pattern 164, which is shown in the right-hand view of FIG. 3*c*. For example, the thickness of the first and second layers 142, 144 varies along the longitudinal extent of the wear indicator 140, to define the pattern 164 that is revealed upon wear of the third and fourth layers 146, 148. In this way, the first and second layers 142, 144 indicates to the user that the cutting element is fully worn and may need replacing.

It will be appreciated that, although the multi-layered structure has been described above with respect to having four layers of coating material, the multi-layered wear indicator may have two or more layers. For example, the wear indicator 140 may comprise a first, permanent layer of coating material that is affixed to the outwardly-facing surface 125 of the cutting element, and also a second, outer layer of coating material comprising the dry lubricant additive.

Furthermore, although the tactile wear indicator has been described above with respect to having a multi-layered structure, this is not required. For example, the wear indicator 140 may comprise a single wearable layer of coating material comprising a dry lubricant additive, wherein the layer covers the outwardly-facing surface 125 of the cutting element in a skin facing region 120 thereof. In such arrangements, the cutting element itself, specifically the surface 125 of the stationary cutting member, may be a comparatively abrasive one in that it has a larger coefficient of friction that the wearable outer layer. Further, the surface 125 may have a contrasting appearance to the outer layer, e.g. by virtue of an indicia provided on that surface.

Figure 4:
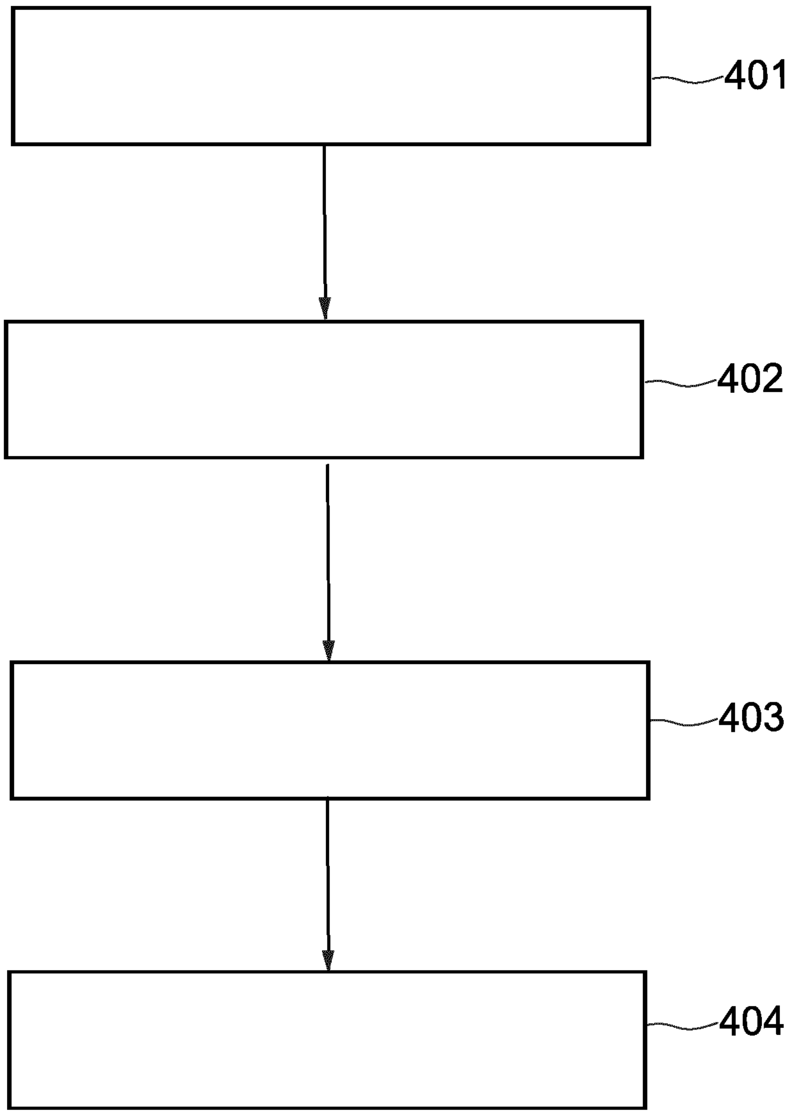
FIG. 4 is a flow chart showing a method of manufacturing a cutting element having a tactile wear indicator.

FIG. 4 is a flow chart illustrating an example method of manufacturing a cutting element having a tactile wear indicator.

The method begins at block 401, at which a cutting element of the type described above with respect to FIGS. 1 and 2 is provided. The cutting element comprises a cutting edge and a skin-facing region and optionally any one or more of the features of the cutting element described above. At block 402, the method comprises providing a binding agent in the form of a print agent. There may be one binding agent provided for each layer of coating material to be affixed to the cutting element or one binding agent for two or more layers of coating material to be affixed to the cutting element. At block 403, the method comprises combining or mixing the binding agent with a dry lubricant additive, such as that of the type described above, to form a coating material to be applied to the skin-facing region of the cutting element. This may comprise mixing the binding agent with a volume of dry lubricant particles that corresponds to 1-20%, e.g. 1-10%, e.g. 5%, by weight of the final, mixed coating material. At this block, the method may further comprise adding a desired quantity of filler material, e.g. substantially as described above with respect to FIG. 3. At block 404, the coating material is provided in the skin-facing region of the cutting element, thereby forming a wearable outer layer of dry lubricant additive, where that layer defines a skin-contact surface of the cutting element.

The coating material may be provided in the skin-facing region by affixing the coating material directly to an outwardly-facing surface of, e.g. a stationary cutting member of, the cutting element. However, in some arrangements the tactile wear indicator has a multi-layered structure and so the method comprises a first step of affixing a first layer of coating material directly to the outwardly-facing surface of the stationary cutting member and then affixing the coating material for the wearable outer layer (directly or indirectly via one or more other layers) on top of the first layer. As described above, the first layer may be a permanent layer of coating material, such as the first or second layer described above with respect to FIG. 3.

Any suitable method may be used to affix a coating material. Where the binding agent of the wearable outer layer comprises a print agent, the coating material is affixed to the stationary cutting member (or first layer) by performing a print method. Suitable print methods include inkjet printing, by which droplets of liquid-phase coating material are deposited on to the surface to be coated, and additive manufacturing techniques, by which quantities of the coating material in liquid or solid powder-based form are successively deposited and solidified, e.g. by heating, on top of each other to build up a thickness of coating material forming the layer. In other arrangements, chemical solidification techniques, such as ultraviolet curing whereby ultraviolet light is used to initiate a photochemical reaction that solidifies a curable print agent, may be used.

It will be appreciated that the steps or blocks of the flow chart described above need not be carried out in the described order, and in some cases may be performed in a reversed order to that shown. In some cases, one or more of the blocks or steps may be performed at the same time.

Figure 5:
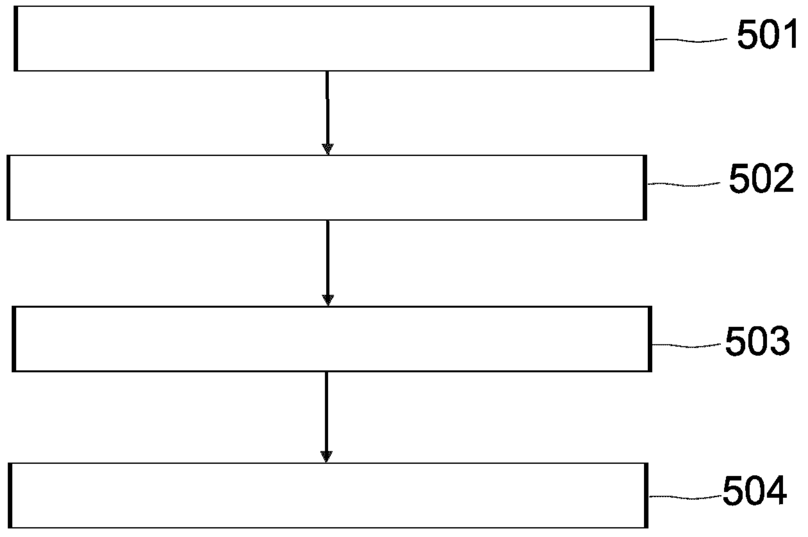
FIG. 5 is a flow chart showing a method of manufacturing the tactile wear indicator of FIG. 3.

FIG. 5 is a flow chart schematically illustrating a method of manufacturing the tactile wear indicator 140 having the multi-layered structure described above with respect to FIG. 3.

In the present embodiment, each layer of coating material comprises a print agent which is in the form of a solvent-based ink that is printed using a method referred to as "pad printing", wherein an elastically deformable pad is used to transfer the coating material from a printing plate source to a surface to be coated. The method comprises the following steps:

1. Printing, at block 501, the first layer 142 by depositing the coating material for that layer 142 on to the outwardly-facing surface 125 of the cutting element 106 in the skin-facing region 120 thereof.
2. Printing, at block 502, the second layer 144 by depositing the coating material for that layer 144 on to an outwardly-facing surface of the first layer 142.
3. Printing, at block 503, the third layer 146 by depositing the coating material for that layer 146 on to an outwardly-facing surface of the second layer 144.
4. Printing, at block 504, the fourth layer 148 by depositing the coating material for that layer 148 on to an outwardly-facing surface of the third layer 146.

In the manner described above, the present invention may provide a versatile wear indicator that can provide the user with a tactile indication and in some cases a visual indication of the wear of the cutting element. While the invention has been illustrated and described in detail in the drawings and foregoing description, such illustration and description are to be considered illustrative or exemplary and not restrictive; the invention is not limited to the disclosed embodiments.

For example, although embodiments of the tactile wear indicator have been described above as having a layered structure wherein respective layers have different coefficients of friction, this is not required. In some cases, such as those in which additive manufacturing techniques are used to create the wear indicator, it is possible for a single layer of wearable coating material to provide a gradual friction change as that layer wears down. For example, a single layer of wearable coating material may be manufactured by providing a different quantity of dry lubricant additives in successive deposits of the coating material when building up a thickness of coating material forming the wearable layer. In that way, a friction coefficient of the skin-contact-surface will increase as the wearable outer layer wears.

Further, the additive manufacturing process may start to build the tactile wear indicator by depositing a resilient material, which is intended to be permanent for the intended normal working life of the cutting element, on to a substrate and then depositing an increasing quantity of wearable material with successive deposits of coating material. This will result in a tactile wear indicator having a permanent section of a first material that contains little to no dry lubricant additive, and a wearable outer layer of coating material forming a skin-contact surface that provides lubrication benefits.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A cutting element for a hair cutting device, wherein the cutting element comprises:

a cutting edge, a skin-facing region and a tactile wear indicator in the skin-facing region;

wherein the tactile wear indicator comprises a wearable outer layer that defines a skin-contact surface of the cutting element, the wearable outer layer comprising a coating material having a plurality of dry lubricant particles dispersed within a binding agent, wherein the binding agent defines a layer and at least some of the dry lubricant particles have spans that are larger than the thickness of the binding agent layer.

2. A cutting element as claimed in claim 1, wherein the wearable outer layer coats a first material having a higher coefficient of friction than that of the coating material forming the wearable outer layer, such that friction to movement along the skin-contact surface will increase as the wearable outer layer of coating material wears away at the interface between the wearable outer layer and the first material.

3. A cutting element as claimed in claim 1, wherein the coating material comprises 1-20% by weight of the dry lubricant additive.

4. A cutting element as claimed in claim 1, wherein at least some of the dry lubricant particles protrude from the binding agent such that the dry lubricant particles form at least part of the skin-contact surface of the cutting element.

5. A cutting element as claimed in claim 1, wherein the dry lubricant particles are in the form of spherical beads.

6. A cutting element as claimed in claim 1, wherein the dry lubricant particles are glass particles.

7. A cutting element as claimed in claim 1, wherein the binding agent is an ink or a paint.

8. A cutting element as claimed in claim 1, further comprising a visual wear indicator, which is provided in the skin-facing region and is covered by the wearable outer layer;

wherein the visual wear indicator has a contrasting appearance to the wearable outer layer and is revealed upon wear of the wearable outer layer.

9. A cutting element as claimed in claim 8, wherein the visual wear indicator is in the form of a first layer of coating material that is affixed to the cutting element.

10. A cutting element as claimed in claim 9, wherein the first layer has:

a first colour that is different to a colour of the wearable outer layer; or an indicia or pattern on a surface which is covered by the wearable outer layer.

11. A cutting element as claimed in claim 1, wherein the wearable outer layer has a wear rate that correlates to a wear rate of a blade of the cutting element.

12. A hair cutting device comprising the cutting element of claim 1.

13. A method for manufacturing a cutting element having a tactile wear indicator, the method comprising:

providing a cutting element comprising a cutting edge and a skin-facing region; and forming a tactile wear indicator by providing a wearable outer layer in the skin-facing region, wherein the wearable outer layer defines a skin-contact surface and comprises a coating material having a plurality of dry lubricant particles dispersed within a binding agent, wherein the binding agent defines a layer and at least some of the dry lubricant particles have spans that are larger than the thickness of the binding agent layer.

* * * * *